(12) United States Patent
Miyazawa et al.

(10) Patent No.: US 6,906,290 B2
(45) Date of Patent: Jun. 14, 2005

(54) METHOD AND DEVICE FOR HEATING PREFORM

(75) Inventors: Hisashi Miyazawa, Isehara (JP); Daisuke Uesugi, Matsudo (JP)

(73) Assignee: Yoshino Kogyosho Co., Ltd., Tokyo (JP)

(*) Notice: Subject to any disclaimer, the term of this patent is extended or adjusted under 35 U.S.C. 154(b) by 37 days.

(21) Appl. No.: 10/432,287

(22) PCT Filed: Jun. 25, 2002

(86) PCT No.: PCT/JP02/06316
§ 371 (c)(1),
(2), (4) Date: Jun. 13, 2003

(87) PCT Pub. No.: WO03/002329
PCT Pub. Date: Jan. 9, 2003

(65) Prior Publication Data
US 2004/0016749 A1 Jan. 29, 2004

(30) Foreign Application Priority Data
Jun. 29, 2001 (JP) .......................... 2001-197755

(51) Int. Cl.⁷ ................................. F27B 9/06
(52) U.S. Cl. ......................... 219/388; 425/500; 264/5
(58) Field of Search .................. 219/388; 425/500, 425/507; 264/5; 432/5

(56) References Cited

U.S. PATENT DOCUMENTS

| | | | |
|---|---|---|---|
| 4,076,071 A | 2/1978 | Rosenkranz et al. | |
| 5,326,258 A | 7/1994 | Gittner et al. | |

FOREIGN PATENT DOCUMENTS

| | | |
|---|---|---|
| DE | 23 52 926 | 4/1975 |
| FR | 74 32906 | 10/1974 |
| JP | A 6-63940 | 3/1994 |
| JP | A 8-142175 | 6/1996 |
| JP | A 11-42702 | 2/1999 |

*Primary Examiner*—Thor S. Campbell
(74) *Attorney, Agent, or Firm*—Oliff & Berridge, PLC

(57) ABSTRACT

While blowing out cooling air to a preform which is biaxially stretched and blow molded into a bottle shape, heat sources are made operative by a high power and the first heating process as quick heating is performed to the preform. Subsequently, the heated preform is left as it is and a temperature adjusting process to reduce a temperature difference between an outer surface temperature and an inner surface temperature of the preform to a predetermined value or less is executed. The second heating process to heat the preform until the outer surface temperature is equal to a temperature which is slightly lower than a crystallization temperature of the PET is executed to the preform obtained after completion of the temperature adjusting process while blowing out the cooling air to the preform. Thus, the quick heating of the preform is safely accomplished without causing an overheating state.

14 Claims, 7 Drawing Sheets

METHOD AND DEVICE FOR HEATING PREFORM

TECHNICAL FIELD

The invention relates to method and device for heating a preform which is biaxially stretched and blow molded into a bottle shape, in which the preform is injection molded into a cylindrical shape with a bottom by a polyethylene terephthalate resin (hereinafter, simply abbreviated to PET) and is biaxially stretched and blow molded into the bottle shape.

BACKGROUND ART

For biaxial stretching blow molding of a preform as an injection molded product made of the PET into a bottle shape, it is necessary to heat the preform to a temperature at which it can be stretched. As a method of heating the preform, there are a method of heating it by a heat transfer from a temperature of an atmosphere and a method of heating it by absorption of light.

According to the method of heating the preform by the heat transfer from the atmosphere temperature, since a coefficient of thermal conductivity of the PET material is slightly lower, it takes a long time to heat the whole preform including an inner surface to a desired temperature. On the other hand, according to the method of heating the preform by the light absorption, since the preform is heated by the light of a wavelength which penetrates into the inner surface of the preform, a time which is necessary for heating the whole preform including the inner surface to the desired temperature or higher is shorter than that of the heating means by the heat transfer mentioned above.

As mentioned above, upon heating of the preform at the time of the biaxial stretching blow molding of the bottle, as disclosed in JP-A-11-42702, an infrared lamp (near infrared heater) for generating near infrared rays is generally used as a heat source. A plurality of near infrared heaters are arranged in parallel along the axial center direction of the conveyed preform and a power of each near infrared heater is adjusted, thereby heating the preform in accordance with a desired temperature distribution along the axial center.

However, even if the near infrared heaters are used as heating sources of the preform or another proper heat source (for example, a sheath heater or the like) is used, since the preform is heated from its outside, the following problem exists. That is, a temperature rising speed on the outer surface side of the preform is certainly higher than that on the inner surface side, a temperature difference occurs between the outside and the inside of the preform which is heated, if the temperature difference is large, the proper biaxial stretching blow molding operation cannot be performed, so that it is necessary to limit the power of the heat sources in order to suppress the heating temperature difference between the inner surface side and the outer surface side of the preform to a predetermined value or less. Thus, heating time of the preform cannot be sufficiently shortened.

A technique using both of near infrared heating means and dielectric heating means in order to shorten the heating time of the preform has been disclosed (refer to JP-A-8-142175). Such a technique, however, has the following problem. That is, since both of those means have to be made operative almost simultaneously, the heating time cannot be sufficiently shortened. Further, since heating equipment is large in size and complicated, a large installing space and the expensive cost of equipment are necessary.

The invention is, therefore, made to solve the problems in the prior arts as mentioned above and it is an object of the invention to realize a technical subject which enables heat sources to operate with a high power upon heating of a preform and to thereby accomplish a large reduction of heating time of the preform and miniaturization of a whole preform heating device.

DISCLOSURE OF INVENTION

As means of the invention according to Claim 1 among the inventions for solving the above technical problems, there is provided a method of heating a preform, whereby the preform which has been injection molded into a cylindrical shape with a bottom and is made of a PET is heated by heat sources in order to be biaxially stretched and blow molded into a bottle shape, comprising the steps of:

to the preform, executing a first heating process to set the heat sources into a high power state while blowing out cooling air to the preform and quickly heat the preform until a temperature of an outer surface of the preform is equal to a temperature value which is slightly lower than a crystallization temperature of the PET;

executing a temperature adjusting process to leave the preform until a temperature difference between the temperature of the outer surface and a temperature of an inner surface of the preform is equal to or less than a predetermined value in a state where the heating by the heat sources and the cooling by the cooling air are not executed;

executing a second heating process to heat the preform after completion of the temperature adjusting process by the heat sources until the outer surface temperature of the preform is equal to a temperature value which is slightly lower than the crystallization temperature of the PET while blowing out the cooling air to the preform;

sequentially executing the first heating process, the temperature adjusting process, and the second heating process; and setting the temperature difference at the end of the temperature adjusting process to a value which is equal to or less than a predetermined value in which the inner surface temperature of the preform at the end of the second heating process is equal to a temperature value in which an inappropriate stretching is not occurred on the inner surface side of the preform.

The crystallization temperature of the PET denotes a temperature at which crystallization occurs in a process in which the temperature of the preform is raised from a neighborhood of a room temperature.

In the first heating process, in a state where the cooling air is blown onto the outer surface of the preform, the preform is heated by the heat sources in a high power state. Therefore, in a state where the heating of the outer surface is suppressed by the cooling air, the preform is quickly heated by the heat sources.

As mentioned above, since the heating of the preform by the heat sources is accomplished in the state where the heating of the outer surface of the preform is suppressed, as a whole preform, it is quickly heated by the high power of the heat sources in a state where a temperature rising speed of the outer surface is slightly suppressed. However, since the heat sources are in the high power state, the blow-out of the cooling air to the preform not only suppresses the temperature rising speed of the outer surface of the preform but also prevents the occurrence of a problem such as carbonization or the like due to the overheat of the outer surface of the preform.

Therefore, since the quick heating of the preform is executed in a state where a difference between the temperature rising speed on the outer surface side and that on the inner surface side is set to be small, even if the preform is quickly heated until the outer surface temperature of the preform is equal to a temperature value which is slightly lower than the crystallization temperature of the PET, the temperature difference between the outer surface temperature and the inner surface temperature of the preform is not so large.

When the temperature adjusting process is performed to the preform subjected to the first heating process, the outer surface side portion of the preform is cooled by the atmosphere, so that its temperature is reduced. On the other hand, the inner surface side portion of the preform is heated by the heat that is transferred from the outer surface side portion and its temperature rises. The temperature difference between the outer surface temperature and the inner surface temperature is set to be equal to or less than a predetermined value, that is, a value in which the inner surface temperature of the preform at the end of the second heating process is equal to a temperature value in which an inappropriate stretching is not occurred on the inner surface side of the preform.

When the second heating process is performed to the preform subjected to the temperature adjusting process, to the outer surface, that is, while the temperature rising speed on the outer surface side is suppressed, the heating process is performed to the preform so that the heating distribution of the preform shows a predetermined pattern. Therefore, when the temperature difference between the outer surface temperature and the inner surface temperature of the preform lies within a range where no trouble is caused in the biaxial stretching blow molding process to the bottle shape of the preform, the preform is heated until the outer surface temperature of the preform is equal to a temperature value which is slightly lower than the crystallization temperature of the PET.

According to the invention of Claim 1 as mentioned above, since the preform is heated while the outer surface portion of the preform which is heated strongest is cooled by the first heating process, the quick heating can be sufficiently performed to the preform without overheating. Thus, the heating time of the preform can be remarkably reduced. After the difference between the outer surface temperature and the inner surface temperature of the preform which is caused by the first heating process is corrected and restricted within the predetermined range by the temperature adjusting process, the second heating process is performed while blowing the cooling air in a manner such that the preform is set to the constant temperature distributing pattern and the temperature difference between the outer surface and the inner surface of the preform is not increased. Thus, the preform can be heated in accordance with the set temperature distribution in a state where the temperature difference between the outer surface and the inner surface of the preform which is biaxially stretched and blow molded into the bottle shape is certainly positioned within the proper range.

The invention of Claim 2 is obtained by adding the following construction to the construction of the invention of Claim 1: the heating by the heat sources to the preform in the second heating process is performed in a manner such that partition plates are arranged among a plurality of heat sources so that a temperature distribution along the axial direction of the preform shows a desired pattern.

In the invention of Claim 2, since a heating portion of the preform by each heat source can be almost accurately set and restricted, the heating distribution along the axial center of the preform due to the second heating process can be set to an almost desired distribution. Thus, the bottle shape which is molded can be set to a thickness distribution.

According to the means of the invention of Claim 3, there is provided a device for heating a preform which has been injection molded into a cylindrical shape with a bottom and is made of a PET by heat sources in order to be biaxially stretched and blow molded into a bottle shape, wherein: the inside of an outer shell arranged so as to surround a conveying path of the preform is divided and formed by partitions into a first zone for performing a first heating process, a third zone for performing a second heating process, and a second zone, positioned between the first and third zones, for performing a temperature adjusting process; and in each of the first and third zones, the heat sources along the conveying path are arranged on one side of the conveying path and a panel for blowout ports in which blowout ports through which cooling air is blown out are opened and formed along the conveying path is arranged so as to stand on the other side of the conveying path so as to face the heat sources.

According to the invention of Claim 3, since each zone is divided and formed by the partition in the outer shell, an almost constant atmosphere is maintained with being hardly exercised by an influence from the outside and an influence among the zones.

In the first zone, the preform which is revolving and move along the conveying path is subjected to the first heating process such that the heating process by the heat sources is executed from one side of the conveying path and, at the same time, the cooling process by the cooling air is executed from the other side as an opposite side of the conveying path, so that the heat sources are set to the high power state without setting the outer surface portion of the preform into the overheating state, thereby accomplishing the quick heating of the preform.

In the second zone, since it is a portion having a substantial hollow space structure without the heating processing mechanism by the heat sources and the cooling processing mechanism by the cooling air, the preform moved from the first zone to the second zone enters a state where it is left in the second zone, and owing to the heat transferring operation in the preform, the temperature difference between the outer surface temperature and the inner surface temperature is set to be equal to or less than the predetermined value as a set temperature value, that is, a value in which the inner surface temperature of the preform at the end of the second heating process is equal to the temperature value in which the inappropriate stretching is not occurred on the inner surface side of the preform.

In the third zone, there is executed the second heating process such that the heating process of the constant temperature distribution by the heat sources is executed from one side of the conveying path and, at the same time, the cooling process to suppress a temperature rising degree on the outer surface side of the preform is executed by the cooling air from the other side as an opposite side of the conveying path. Thus, the preform is heated in accordance with the set temperature distribution without increasing the temperature difference between the outer surface side and the inner surface side of the preform.

The invention of Claim 4 is obtained by adding the following construction to the construction of the invention of Claim 3: a rectifying plate member for guiding the blowout cooling air to the oblique upstream side of the conveying path is attached to an opening edge of the blowout port of the panel for blowout ports on the downstream side along the conveying path of the preform.

In the invention of Claim 4, since the cooling air from each blowout port is blown out to the oblique upstream side of the conveying path, the cooling air from each of the blowout ports formed at regular intervals in the panel for blowout ports is blown out to each preform moving on the conveying path in a continuous state. The constant cooling operation is continuously applied to the preform.

The invention of Claim 5 is obtained by adding the following construction to the construction of the invention of Claim 3 or 4: the surface of the panel for blowout ports on the conveying path side is used as a reflecting surface for reflecting the light from the heat sources.

In the invention of Claim 5, the light from the heat sources which penetrated the conveying path can be reflected by the panel for blowout ports and irradiated to the preform without being irradiated to the preform, so that heating efficiency of the preform by the heat sources is improved.

The invention of Claim 6 is obtained by adding the following construction to the construction of the invention of Claim 3, 4, or 5: near infrared heaters are used as heat sources.

In the invention of Claim 6, since the heating of the preform is accomplished by absorption of the near infrared light which is irradiated from the near infrared heaters, the heating speed on the inner surface side of the preform can be raised. Thus, the heating speed of the preform can be further increased.

BEST MODE FOR CARRYING OUT THE INVENTION

Figure 1:
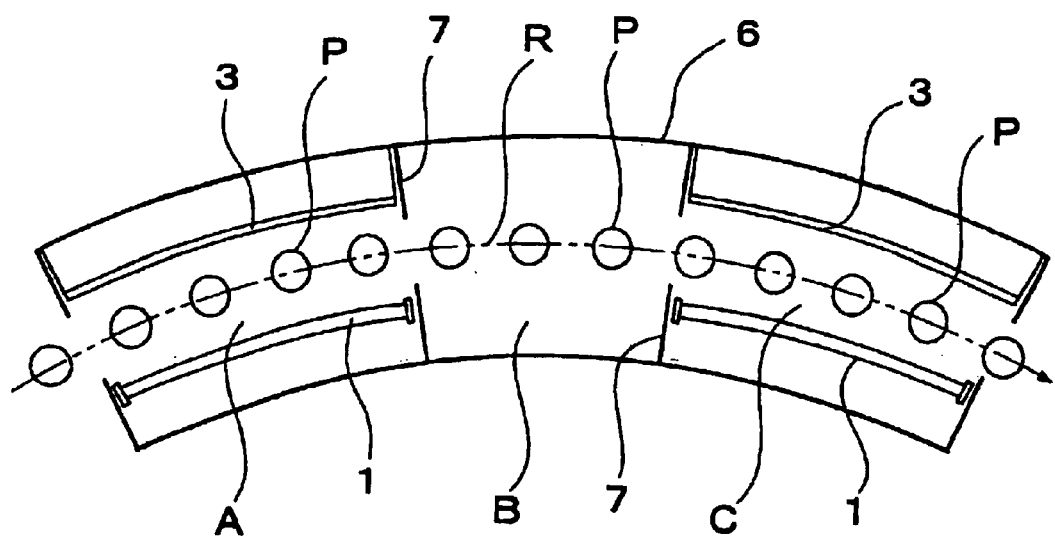
FIG. 1 is a schematic constructional plan view showing an embodiment of a device of the invention.
Figure 2:
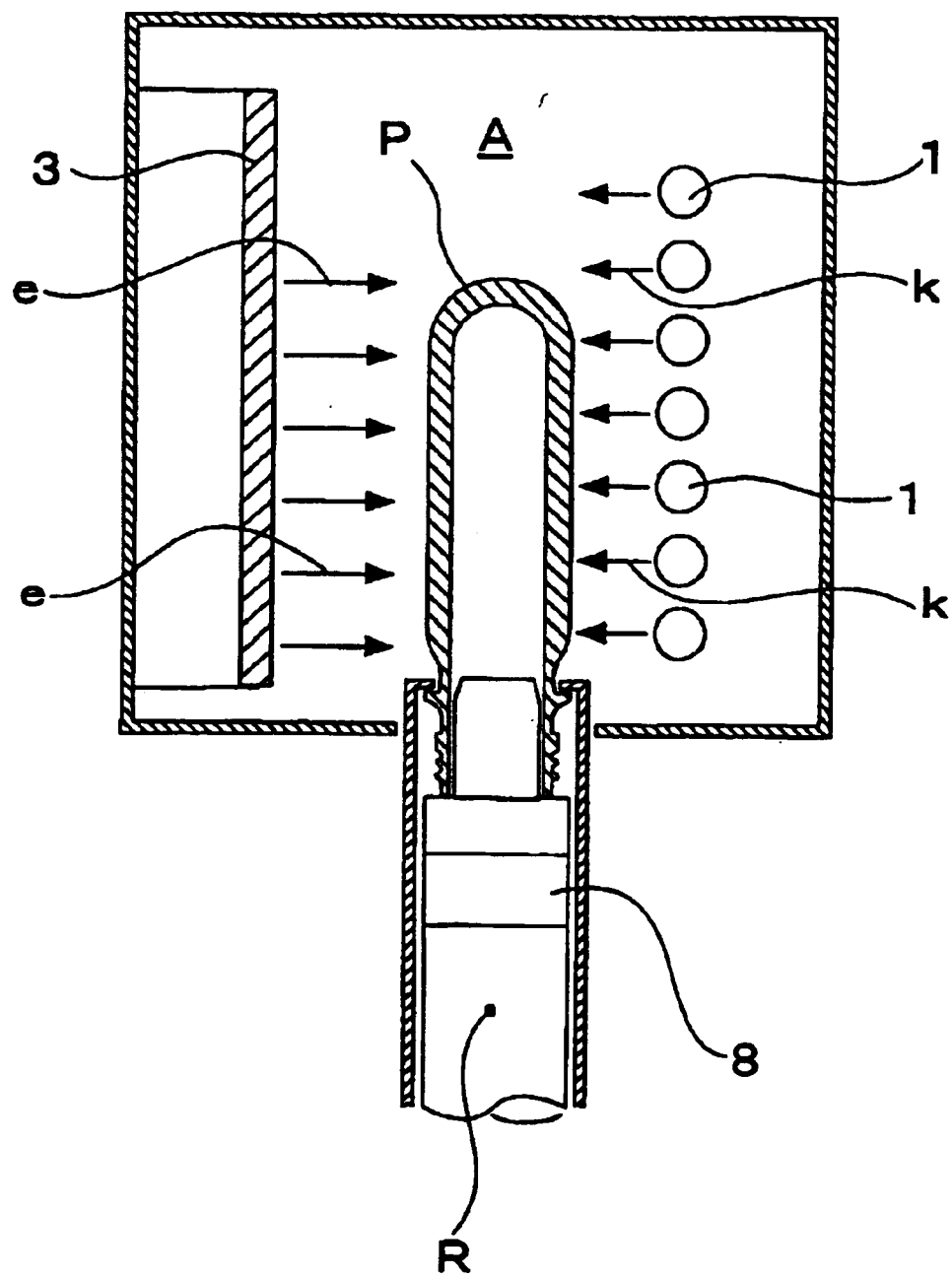
FIG. 2 is a schematic constructional vertical sectional view of a first zone in the embodiment shown in FIG. 1.
Figure 3:
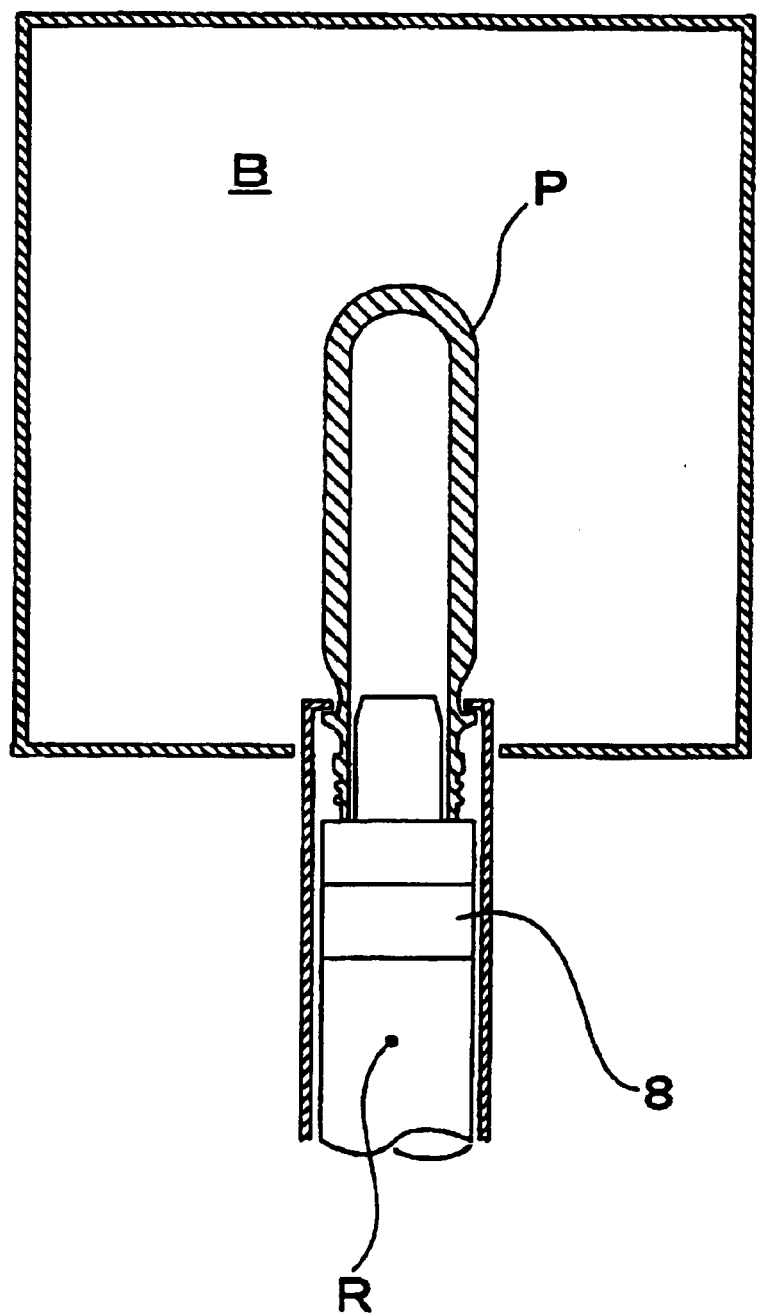
FIG. 3 is a schematic constructional vertical sectional view of a second zone in the embodiment shown in FIG. 1.
Figure 4:
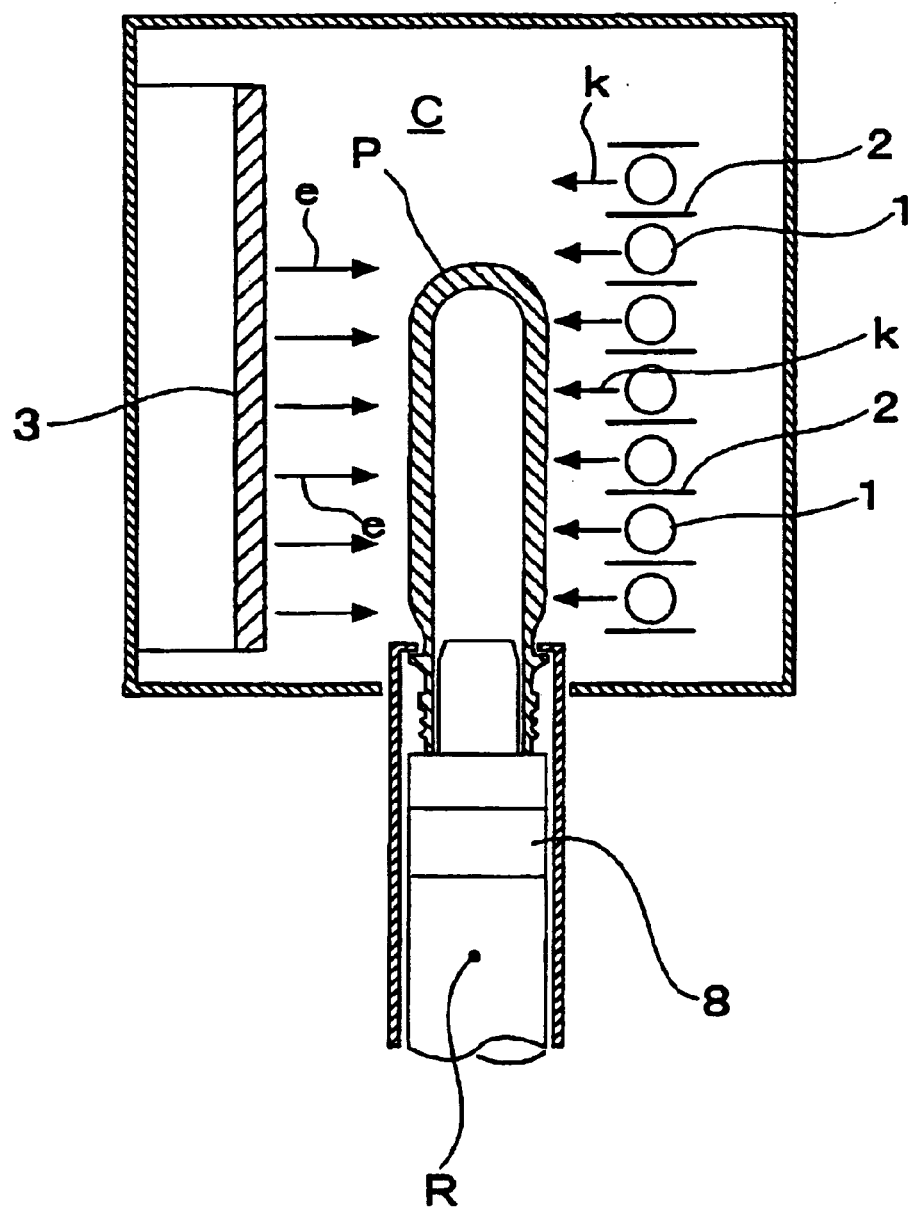
FIG. 4 is a schematic constructional vertical sectional view of a third zone in the embodiment shown in FIG. 1.
Figure 5:
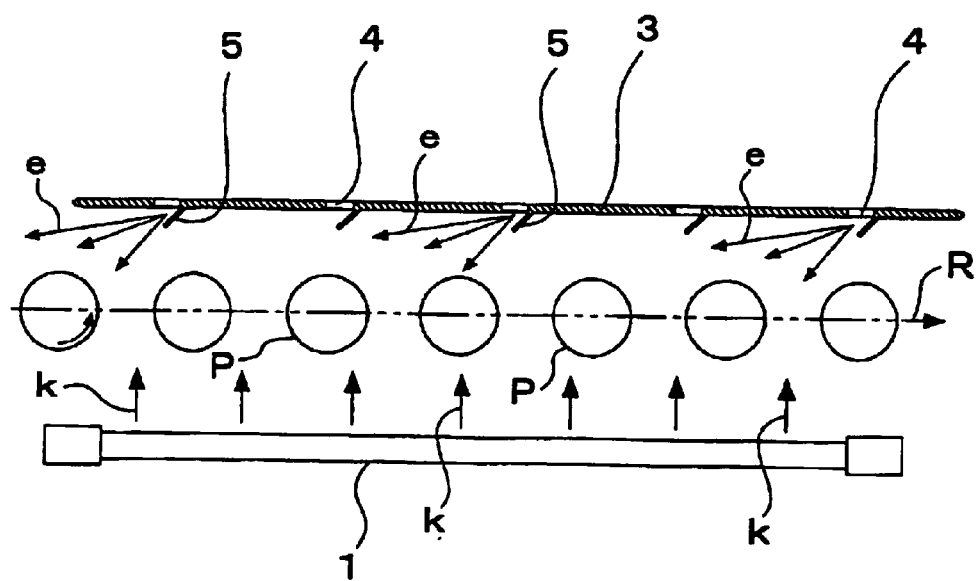
FIG. 5 is an arrangement relational diagram of heat sources and a panel for blowout ports in the embodiment shown in FIG. 1.
Figure 6:
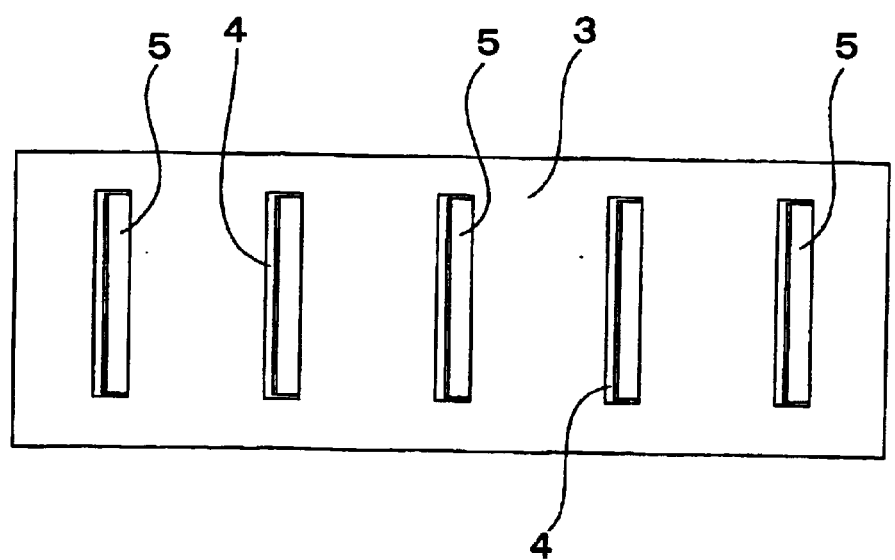
FIG. 6 is a whole front view of the panel for blowout ports shown in FIG. 5.

An embodiment of the invention will be described hereinbelow with reference to the drawings.

FIGS. 1 to 6 show the embodiment of a device of the invention. The device is formed by a turntable, a chain, and the like. A long rectangular cylindrical outer shell 6 made of a heat resisting material is arranged along a conveying path R for conveying a preform P held to a mandrel 8 in a headstanding posture while revolving the preform together with the mandrel 8 so as to surround the conveying path R. The inside of the outer shell 6 is divided by partitions 7 made of a heat resisting material in order of a first zone A, a second zone B, and a third zone C from the upstream side of the conveying path R (refer to FIG. 1).

The first zone A (refer to FIGS. 1, 2, and 5) is constructed as follows. Near infrared heaters serving as a plurality of heat sources 1 extending along the conveying path R are arranged on one side of the conveying path R in parallel along the axial center direction of the preform P. On the other side of the conveying path R, a panel 3 for blowout ports in which a plurality of blowout ports 4 which are long in the longitudinal direction are opened at regular intervals along the conveying path R and which is assembled to a front edge of a duct for guiding cooling air e is arranged so as to stand facing the heat sources 1 as near infrared heaters. A first heating process (a) is executed to the preform P.

The surface (surface which faces the heat sources 1) of the panel 3 for blowout ports (refer to FIGS. 5 and 6) is used as a reflecting surface for reflecting near infrared rays k. A rectifying plate member 5 for guiding the cooling air e which is blown out from the blowout ports 4 to the oblique upstream side of the conveying path R is provided for one side edge (side edge serving as a downstream side of the conveying path R) of each blowout port 4 so as to be in a half blanking shape and in an obliquely standing posture.

The second zone B (refer to FIGS. 1 and 3) has a hollow space structure without heat processing means such as heating means, cooling means, etc. for the preform P. The second zone B is divided so as to be in a state where it is shut off as much as possible from both of the neighboring first zone A and third zone C with respect to the atmosphere, particularly, thermal atmosphere, and a temperature adjusting process b is executed.

In the third zone C (refer to FIGS. 1 and 4), in addition to the construction of the first zone A, partition plates 2 for restricting an irradiating range of the near infrared rays k which are irradiated from each heat source 1 onto the preform P are added among the heat sources 1. A second heating process c as a final heating process is executed to the preform P.

Figure 7:
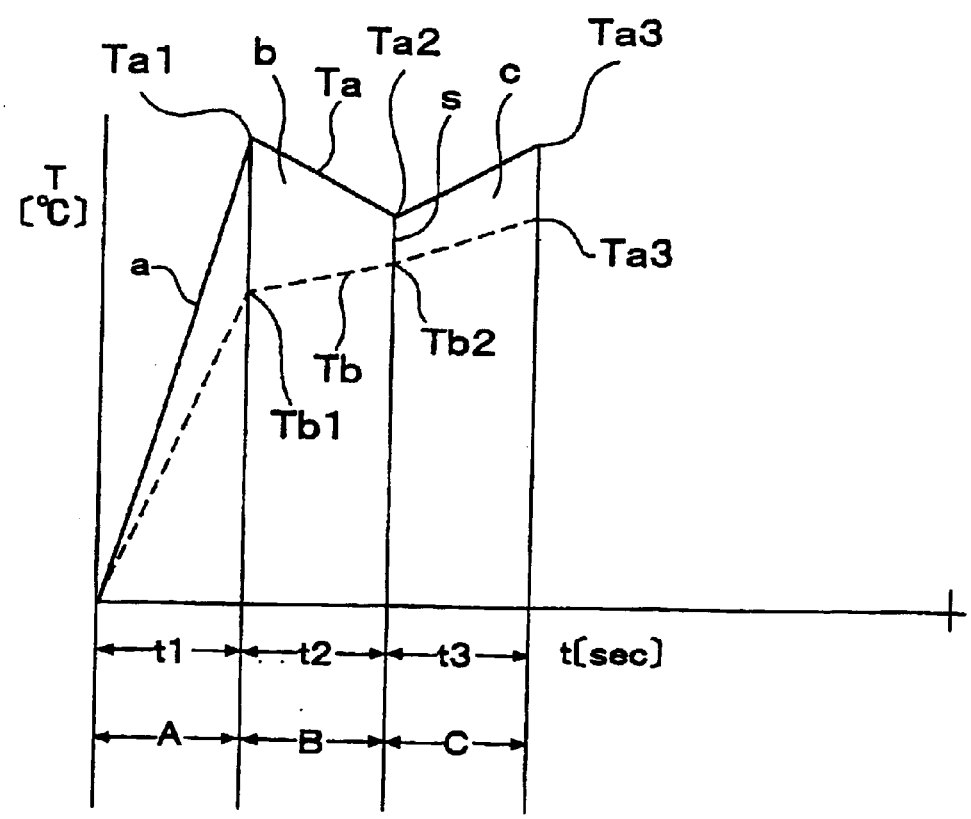
FIG. 7 is a temperature characteristics diagram for use in explanation of the heating operation of the invention.

FIG. 7 shows an example of change characteristics of an outer surface temperature Ta and an inner surface temperature Tb of the preform (P) which is heated by the method of the invention. Each processing time is determined in accordance with values of the outer surface temperature Ta and the inner surface temperature Tb at the time of each process in a manner such that the outer surface temperature Ta at the end of the heating process of the invention lies within a range from 100 to 120° C. and the inner surface temperature Tb lies within a range from 85 to 105° C.

The first heating process (a) in the first zone A is a quick heating process in which the heat sources 1 are made operative by a power of 100%. Although the first heating process (a) is finished at timing when the outer surface temperature Ta reaches a first temperature Ta1 within a range from 110 to 120° C. that is slightly lower than a crystallization temperature of the PET, first heating time t1 as time of the first heating process (a) is equal to 7.3 seconds. A first temperature Tb1 as an inner surface temperature Tb at the end of the first heating process (a) lies within a range from 70 to 80° C. A temperature difference between the first temperature Ta1 and the first temperature Tb1 has a large value of 40° C.

The temperature adjusting process b in the second zone B is finished at the following timing: the preform P which was quickly heated to a desired temperature by the first heating process (a) is left in the constant atmosphere without performing the heating process from the outside, so that the outer surface temperature Ta is decreased by heat irradiation, the inner surface temperature Tb is increased by heat transfer from the outer surface side portion of the preform P, and a temperature difference s between a second temperature Ta2 of the outer surface temperature Ta and a second temperature Tb2 of the inner surface temperature Tb is equal to a preset temperature 10° C. which is equal to or lower than a predetermined value (according to a result of experiments, 20° C. for the present). However, temperature adjustment time t2 as time of the temperature adjusting process b is equal to 4.0 seconds. The second temperature Ta2 of the outer surface temperature Ta at the end of the temperature adjusting process b lies within a range from 90 to 100° C. The second temperature Tb2 of the inner surface temperature Tb lies within a range from 80 to 90° C.

According to the second heating process c in the third zone C, an output degree of each heat source 1 is individually set to a predetermined value and the preform P is heated so as to obtain desired temperature distribution along its axial center. The second heating process c is finished when a third temperature Ta3 of the outer surface temperature Ta reaches a temperature of 100 to 120° C. which is slightly lower than the crystallization temperature of the PET. However, second heating time t3 as time of the second heating process c is equal to 6.0 seconds. A third temperature Tb3 as an inner surface temperature Tb at the end of the second heating process c lies within a range from 85 to 105° C. A temperature difference between the third temperature Ta3 and a third temperature Tb3 is equal to 15° C. at which there is no problem when the preform P is biaxially stretched and blow molded into a bottle shape.

In the second heating process c in the third zone C, the reason why the temperature difference between the outer surface temperature Ta and the inner surface temperature Tb is not so large in spite of the fact that the second heating process c is quick heating of a certain extent is because the outer surface of the preform P is forcedly cooled by the cooling air e.

According to a result of the actual measurement of the invention, time which is necessary for heating the preform P at an ordinary temperature until a temperature at which it can be biaxially stretched and blow molded into a bottle shape, that is, total time of the first heating time t1, the temperature adjustment time t2, and the second heating time t3 is equal to (7.2+4.0+6.0=17.2) seconds and equal to almost half of the conventional one. Thus, a length of heating device along the conveying path R can be set to half of the conventional one.

Each of the first heating time t1, the temperature adjustment time t2, and the second heating time t3 changes in dependence on a difference of an average thickness of a body portion including a bottom portion of the preform P in accordance with a tendency such that the thicker the average thickness is, the time becomes slightly long. However, the total time is similarly equal to about half of the conventional one.

EFFECTS OF THE INVENTION

Since the invention has the construction mentioned above, the following effects are obtained.

According to the invention of Claim 1, since the preform is heated while the outer surface portion of the preform is cooled, the outer surface portion which is heated strongest can be safely and quickly heated without setting it into the overheating state. Thus, the remarkable reduction of the heating processing time of the preform is accomplished and the remarkable improvement of the efficiency of the biaxial stretching blow molding operation is accomplished.

Since the large temperature difference between the outer surface side and the inner surface side of the preform which is caused by the forced heating from the outside is decreased by the temperature adjusting process to the value in which the good biaxial stretching blow molding process can be certainly obtained, the proper and good biaxial stretching blow molding operation can be stably obtained.

Further, since the heating of the preform to the preset temperature distribution is accomplished by forcedly cooling the outer surface portion of the preform so that the temperature difference between the outer surface side and the inner surface side of the preform is not so large, the heating of the preform to the preset temperature distribution can be naturally, smoothly, and quickly accomplished.

In the invention of Claim 2, the heating distribution of the preform by the second heating process can be set to the almost desired distribution. Thus, the thickness distribution of the bottle shape which is molded can be set. In the second heating process of the preform, since the heating process can be accomplished while suppressing the increase in temperature difference between the outer surface side and the inner surface side of the preform, the heating process of the preform to the temperature suitable for the biaxial stretching blow molding can be safely accomplished.

According to the invention of Claim 3, since the first zone and the third zone can be easily constructed and the zones can be easily divided and formed, the invention of Claim 1 can be easily and preferably embodied.

Since the desired heating process to the preform can be completed in a short time, a length of line which is required for the heating process can be reduced. Thus, a length along the conveying path of the preform of the heating device can be decreased, so that sufficient miniaturization of the heating device can be accomplished.

According to the invention of Claim 4, since the cooling air can be blown out in a continuous state to each preform which is moving on the conveying path, the constant cooling operation can be continuously performed to the preform. Thus, the stable and certain overheat preventing operation to the preform can be obtained.

According to the invention of Claim 5, since the heating process of the preform by the heat sources can be efficiently accomplished, the rated values of the heat sources and the electric power which is required for heating can be reduced.

According to the invention of Claim 6, since the heating of the preform can be accomplished in a state where a large temperature difference is not caused between the outer surface side and the inner surface side of the preform, the more rapid heating process of the preform can be obtained and the heating time can be further decreased.

What is claimed is:

1. A method of heating a preform, whereby the preform (P) which has been injection molded into a cylindrical shape with a bottom and is made of a polyethylene terephthalate resin is heated by heat sources (1) in order to be biaxially stretched and blow molded into a bottle shape, comprising the steps of sequentially executing the following processes to said preform (P): a first heating process (a) to set said heat sources (1) into a high power state while blowing out cooling air (e) to said preform (P) and quickly heat the preform (P) until a temperature (Ta) of an outer surface of said preform (P) is equal to a temperature value which is slightly lower than a crystallization temperature of said polyethylene terephthalate resin; a temperature adjusting process (b) to leave the preform (P) until a temperature difference (s) between the outer surface temperature (Ta) and an inner surface temperature (Tb) of said preform (P) is equal to or less than a predetermined value in a state where the heating by said heat sources (1) and the cooling by said cooling air (e) are not executed; and a second heating process (c) to heat the preform (P) after completion of said temperature adjusting process (b) by said heat sources (1) until the outer surface temperature (Ta) of said preform (P) is equal to a temperature value which is slightly lower than the crystallization temperature of the polyethylene terephthalate resin while blowing out the cooling air (e) to the preform (P), wherein said temperature difference (s) at the end of said temperature adjusting process (b) is set to a value which is equal to or less than a predetermined value in which the inner surface temperature (Tb) of said preform (P) at the end of said second heating process (c) is equal to a temperature value in which an inappropriate stretching is not occurred on the inner surface side of said preform (P).

2. A method of heating the preform according to claim 1, wherein the heating by the heat sources (1) to the preform (P) in said second heating process (c) is performed in a manner such that partition plates (2) are arranged among a plurality of heat sources (1) so that a temperature distribution along an axial direction of said preform (P) shows a desired pattern.

3. A device for heating a preform (P), which has been injection molded into a cylindrical shape with a bottom and is made of a polyethylene terephthalate resin, heat sources (1) in order to be biaxially stretched and blow molded into a bottle shape, comprising: an inside of an outer shell (6) arranged so as to surround a conveying path (R) of said preform (P) is divided and formed by partitions (7) into a first zone (A) for performing a first heating process (a), a third zone (C) for performing a second heating process (c) wherein partition plates (2) are arranged among a plurality of heat sources (1) so that a temperature distribution along an axial direction of said preform (P) shows a desired pattern, and a second zone (B), positioned between said first zone (A) and said third zone (C), for performing a temperature adjusting process (b); and in each of said first and third zones, the heat sources (1) are arranged along the conveying path (R) on one side of said conveying path (R) and a panel (3) for blowout ports in which blowout ports (4) through which cooling air (e) is blown out are opened and formed along said conveying path (R) is arranged so as to stand on the other side of said conveying path (R) so as to face said heat sources (1).

4. A device for heating the preform according to claim 3, wherein a rectifying plate member (5) for guiding the blowout cooling air (e) to an oblique upstream side of said conveying path (R) is attached to an opening edge of said blowout port (4) of said panel (3) for blowout ports on a downstream side along said conveying path (R).

5. A device for heating the preform according to claim 3, wherein a surface of said panel (3) for blowout ports on the side of said conveying path (R) is used as a reflecting surface for reflecting light from said heat sources (1).

6. A device for heating the preform according to claim 3, wherein near infrared heaters are used as said heat sources (1).

7. A device for heating the preform according to claim 4, wherein a surface of said panel (3) for blowout ports on the side of said conveying path (R) is used as a reflecting surface for reflecting light from said heat sources (1).

8. A device for heating the preform according to claim 4, wherein near infrared heaters are used as said heat sources (1).

9. A device for heating the preform according to claim 5, wherein near infrared heaters are used as said heat sources (1).

10. The method of heating a preform according to claim 1, wherein in the first heating process (a) the preform (P) is heated to a temperature (Ta) from 110° C. to 120° C.

11. The method of heating a preform according to claim 1, wherein in the first heating process (a) the preform (P) is heated in less than 10 seconds.

12. The method of heating a preform according to claim 1, wherein in the temperature adjusting process (b), the temperature difference (s) is less than 20°.

13. The method of heating a preform according to claim 1, wherein in the second heating process (c) the temperature (Ta) is from 100° C. to 120° C.

14. The method of heating a preform according to claim 1, wherein in the second heating process (c) the inner surface temperature (Tb) is 85° C. or more.

* * * * *